United States Patent
Gritter et al.

(10) Patent No.: US 6,407,529 B1
(45) Date of Patent: Jun. 18, 2002

(54) METHOD FOR CONTROLLING THE STARTING OF AN INDUCTION MOTOR UTILIZING CLOSED LOOP ALPHA CONTROL

(75) Inventors: David J. Gritter, Wauwatosa, WI (US); Dora Yuan Wang, Shanghai (CN)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/574,852

(22) Filed: May 19, 2000

(51) Int. Cl.[7] ............................................... H02P 1/26
(52) U.S. Cl. ....................................... 318/778; 318/798
(58) Field of Search ............................... 318/778, 779, 318/798, 799, 805, 809

(56) References Cited

U.S. PATENT DOCUMENTS

| | | | |
|---|---|---|---|
| 3,991,354 A | | 11/1976 | Rosa et al. ................. 318/231 |
| 4,482,853 A | * | 11/1984 | Bhavsar ....................... 318/778 |
| 4,712,054 A | | 12/1987 | Boldt .......................... 318/758 |
| 4,796,142 A | | 1/1989 | Libert ........................... 361/23 |
| 4,912,390 A | * | 3/1990 | Curran, Jr. et al. ......... 318/812 |
| 4,978,897 A | * | 12/1990 | Merrison et al. ........... 318/268 |
| 5,008,608 A | * | 4/1991 | Unsworth et al. .......... 318/729 |
| 5,151,642 A | * | 9/1992 | Lombardi et al. .......... 318/779 |
| 5,225,992 A | | 7/1993 | Kobari et al. ............... 364/483 |
| 5,305,234 A | | 4/1994 | Markus et al. .............. 364/550 |
| 5,568,753 A | * | 10/1996 | Chen et al. .................. 318/809 |
| 6,160,365 A | * | 12/2000 | Younger et al. .............. 318/16 |
| 6,163,129 A | * | 12/2000 | Younger et al. ............ 318/799 |

OTHER PUBLICATIONS

"A Comparative Study of Symmetrical Three–Phase Circuits for Phase–Controlled AC Motor Drives" By William McMurray, May/Jun. 1974 pp. 403–411, vol. 1A–10.

* cited by examiner

Primary Examiner—Robert E. Nappi
Assistant Examiner—Rina I. Duda
(74) Attorney, Agent, or Firm—Boyle Fredrickson Newholm Stein & Gratz S.C.

(57) ABSTRACT

A method is provided for controlling a three-phase, AC induction motor. Each phase of the AC induction motor is connected to an AC input source by a thyristor switch and a bypass contactor connected in parallel in order to provide voltage and current to the AC induction motor. The method includes the steps of sequentially firing pairs of thyristor switches at a predetermined initial alpha firing angle. A new alpha firing angle is calculated which is dependant upon the initial alpha firing angle. Thereafter, pairs of thyristor switches are fired at the new alpha firing angle. The new alpha firing angle is provided as the initial alpha firing angle and a new alpha firing angle is calculated. The process is repeated until the AC induction motor reaches its full operating speed.

12 Claims, 8 Drawing Sheets

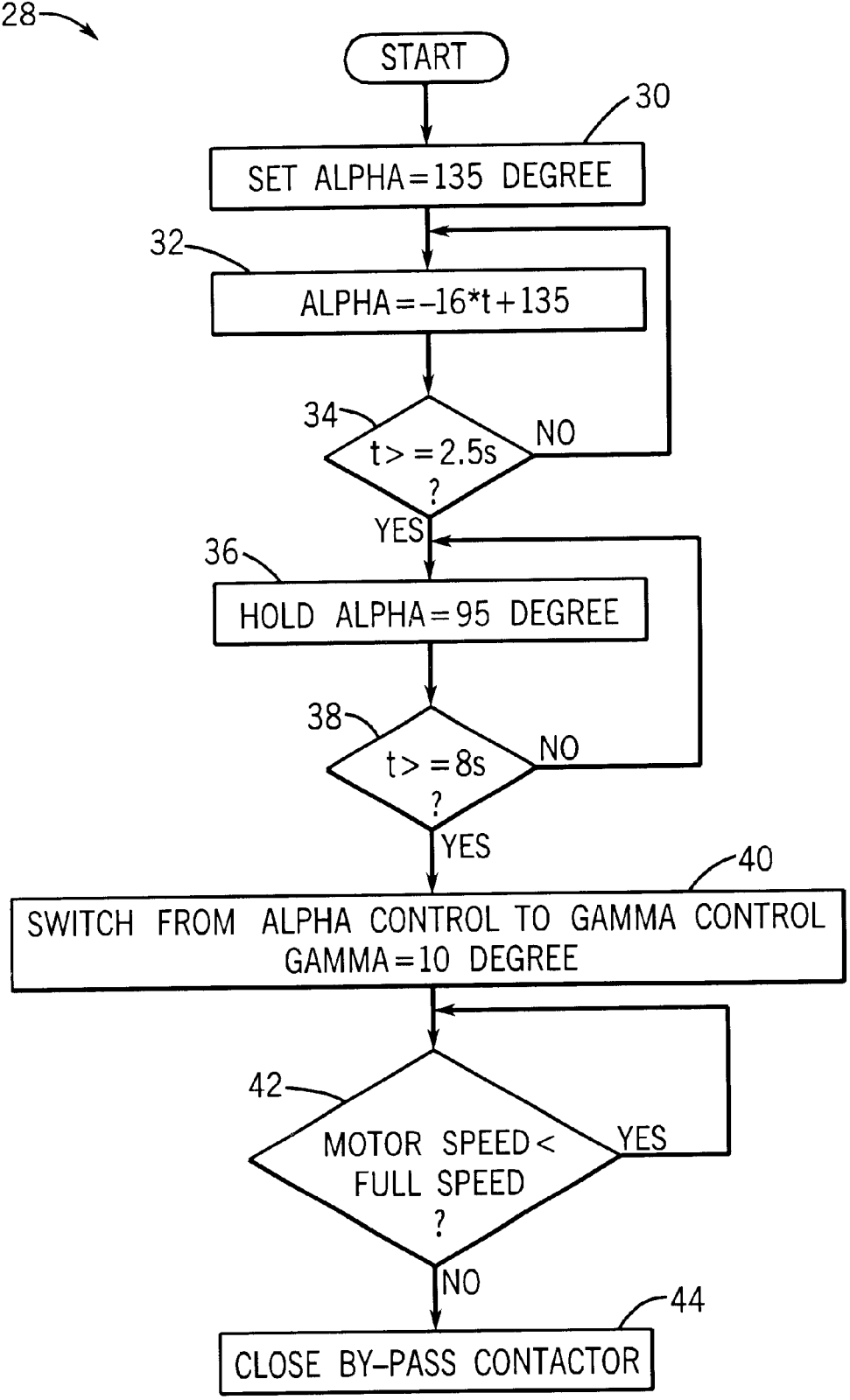

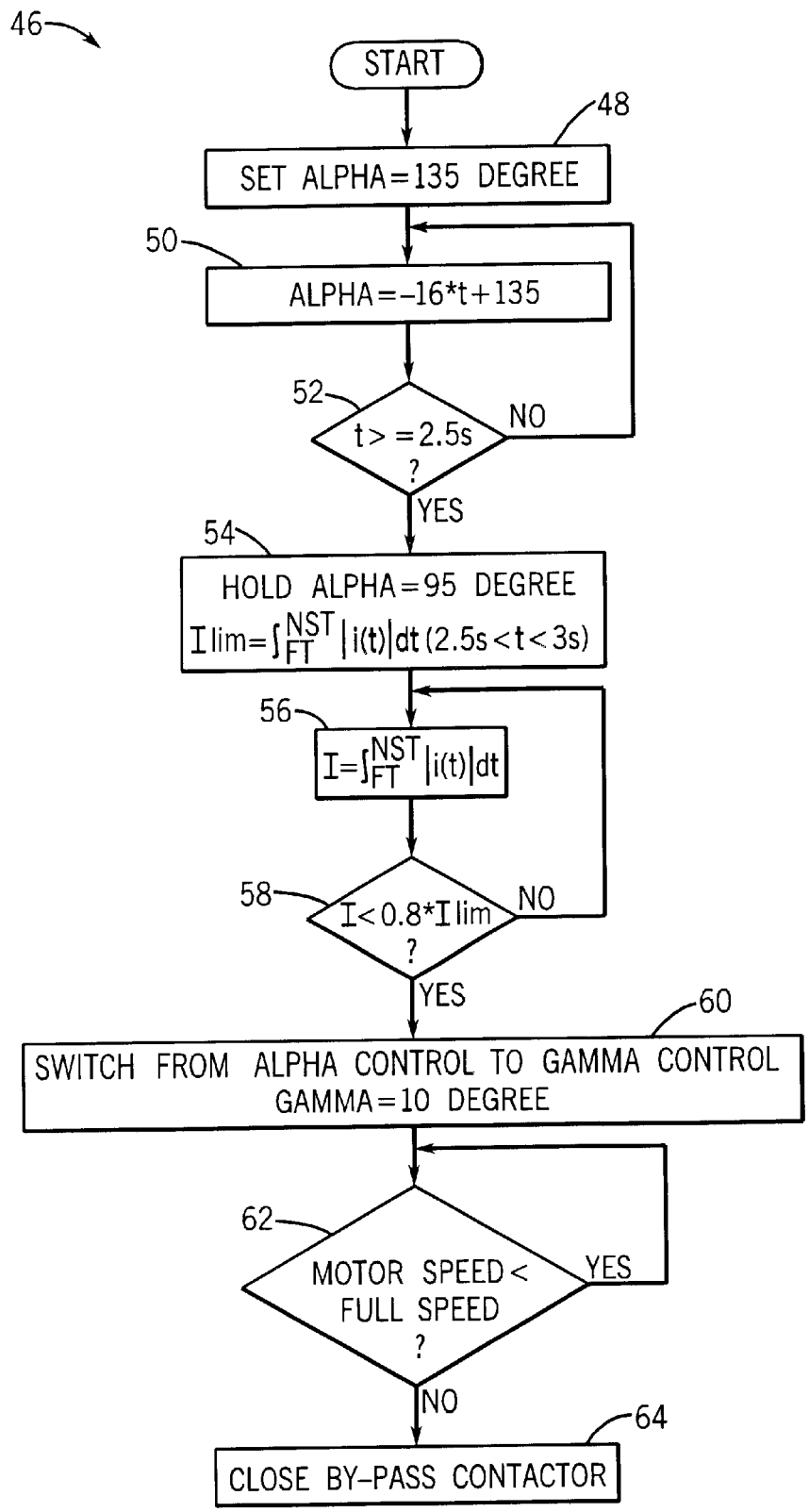

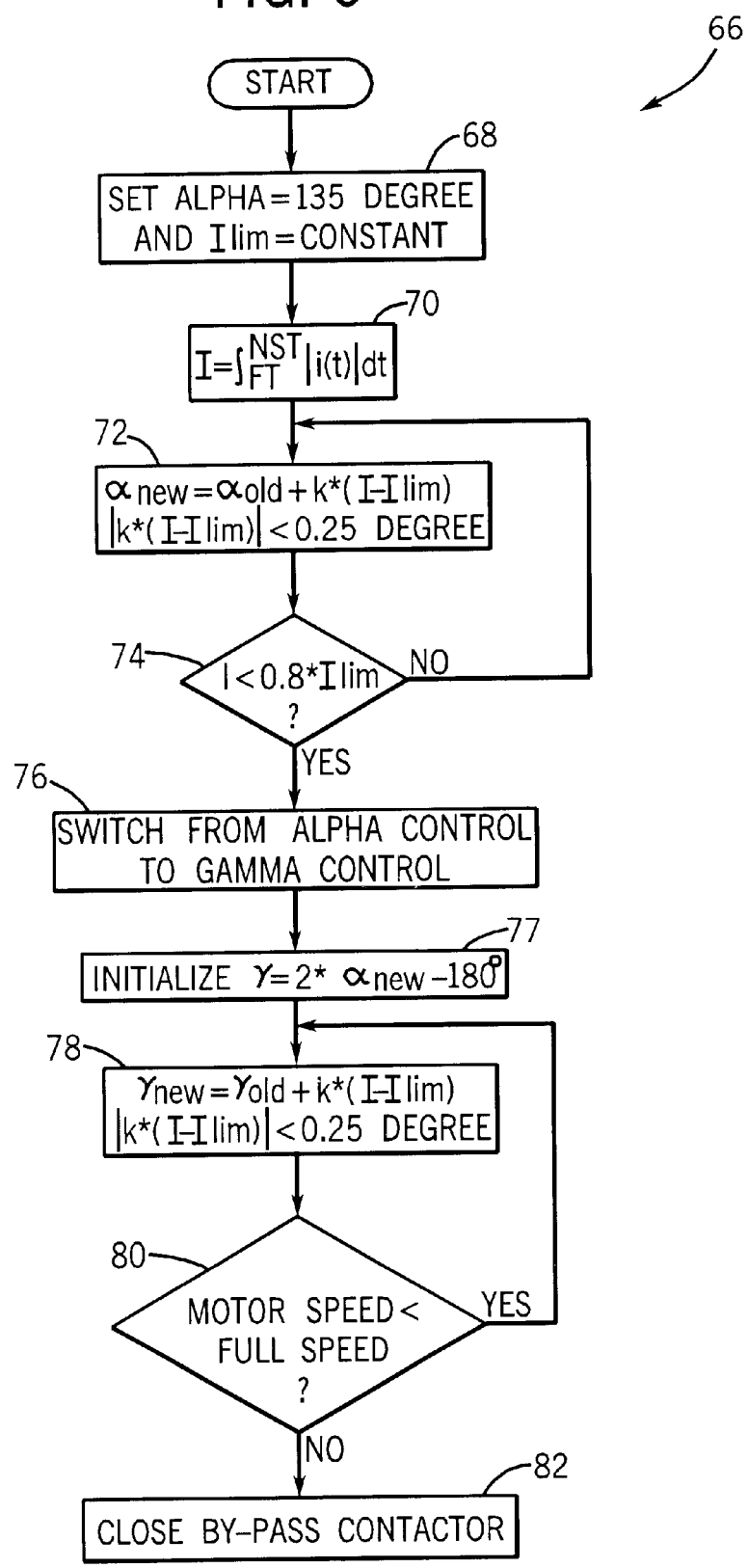

METHOD FOR CONTROLLING THE STARTING OF AN INDUCTION MOTOR UTILIZING CLOSED LOOP ALPHA CONTROL

FIELD OF INVENTION

This invention relates to motor controls, and in particular, to a method of controlling the starting of an AC induction motor with a soft starter.

BACKGROUND AND SUMMARY OF THE INVENTION

There are two basic approaches for controlling the starting, stopping and speed of an AC induction motor. In a first approach, an adjustable frequency controller is interconnected to the AC induction motor. The adjustable frequency controller is comprised of an inverter which uses solid state switches to convert DC power to stepped waveform AC power. A waveform generator produces switching signals for the inverter under control of a microprocessor. While adjustable frequency controllers efficiently control the motor speed and the energy used by an AC induction motor, use of such types of controllers may be cost prohibitive. Further, since many applications of AC induction motors do not require sophisticated frequency and voltage control, an alternative to adjustable frequency controllers has been developed.

An alternate approach to the adjustable frequency controller is the soft starter. Soft starters operate using the principal of phase control whereby the line currents supplied to the AC induction motor are controlled by means of anti-parallel thyristor switches. Soft starters offer two major benefits for a user. First, use of a soft starter reduces the motor torque pulsation at startup of the AC induction motor which, in turn, results in less mechanical strain on the load. Second, use of a soft starter reduces the motor inrush current at startup of the AC induction motor which, in turn, places less stress on upstream electrical systems.

Typically, in a soft starter, the anti-parallel thyristor switches are provided in each supply line. These thyristor switches in each supply line are fired to control the fraction of the half cycle over which current is conducted to the motor (known as the conduction period). The non-conducting period of each half cycle (known as the hold-off angle or the notch width) is visible as a notch in the voltage waveform at each motor terminal. During this period, no current flows to the motor terminals. To end the non-conducting period, the thyristor switches in the supply line to the motor terminals are fired to restart their conduction. The conduction through the thyristor switches continues until the current, once again, becomes zero at some point in the next half cycle and the thyristor switches reopen. According to the principles of phase control, by varying the duration of the non-conducting period, the voltage and current supplied to the AC induction motor may be controlled.

Alternatively, with delta motors, the anti-parallel thyristor switches may be provided inside the delta. Positioning the anti-parallel thyristor switches within the delta allows for use of smaller electrical components since the phase current magnitudes are less than the line current magnitudes.

Heretofore, in order to start an AC induction motor using a soft starter, two alternate types of control algorithms are used. In alpha control, the thyristor switches are sequentially fired at a certain angle, alpha ($\alpha$), after the zero crossing times of the corresponding phase voltages. In gamma control, the thyristor switches are sequentially fired at a certain angle, gamma ($\gamma$), after the zero crossing times of the corresponding phase currents. It has been found that alpha control is more stable than gamma control in starting and bringing the AC induction motor to near operating speed because the zero crossings of the phase voltage are fixed while the zero crossings of the phase current move as the speed of the AC induction motor changes.

In addition, if gamma control is used during such period, greater current oscillation occurs which, in turn, leads to greater torque oscillation. More specifically, torque oscillation when the motor is stalled or when accelerating up to speed generally is caused by a DC component in the motor current. One of the principle advantages of utilizing a soft starter is that by applying the voltage to the motor slowly, these DC offset currents can be eliminated. However, it is possible to re-introduce DC currents when using gamma control. For example, utilizing a constant gamma when the integral of the motor phase current for the positive half cycle differs from the integral of the motor phase current for the negative half cycle, produces a DC component. In fact, if a disturbance introduces a slight asymmetry in firing of the thyristor switches, gamma control will exhibit a tendency to amplify the asymmetry, since an early current zero crossing will cause the next thyristor firing to occur earlier with respect to the terminal voltage. This effect is more pronounced when the soft starter is positioned inside the delta because the thyristor switches directly control phase voltage, that the current through the thyristor switches reflects the actual power of the motor (mostly inductive during acceleration), whereas line current control interposes 30 degree angle between motor terminal voltage and line current being controlled.

Alternatively, gamma control is preferred once the motor has accelerated to the point where its speed is above the breakdown speed, in other words, the speed at which the slope of the speed/torque curve is zero. This is due to the fact that the motor's torque production is a delayed function of speed. Therefore, as the motor accelerates to full speed, it overshoots before the electrical torque balances the mechanical load. Once the motor overshoots, the electrical torque eventually becomes negative and the speed undershoots its steady state value causing torque to become positive again. It may take several cycles of this oscillation to reach steady state when the terminal voltage on the motor is fixed. However, when gamma control is used, the changes in motor power factor caused by the speed changes result in changes in current zero cross time which, in turn, affect the firing point for the next half cycle of current. This results in slight cycle to cycle changes in terminal voltage. These changes have a damping effect on the oscillations described above. In fact, in many cases, the oscillations are damped within a complete cycle.

Therefore, it is a primary object and feature of the present invention to provide an improved method for controlling the starting of an AC induction motor.

It is a further object and feature of the present invention to provide a method for controlling the starting of an AC induction in a stable manner.

It is still a further object and feature of the present invention to provide a method for controlling the starting an AC induction motor which is simple and less expensive than prior art methods.

In accordance with the present invention, a method is provided for controlling a three-phase AC induction motor. Each phase of the induction motor is interconnected to an AC input source by a thyristor switch in order to provide voltage and current to the AC induction motor. The method includes the steps of sequentially firing pairs of thyristor switches at a predetermined initial alpha firing angle after an initial occurrences of zero supply voltage at corresponding motor terminals of the AC induction motor. A new alpha firing angle is calculated which is dependant on the initial alpha firing angle. Pairs of thyristor switches are sequentially fired at the new alpha firing angle after subsequent occurrences of zero supply voltage at corresponding motor terminals of the AC induction motor.

Bypass contactors may be provided in parallel across corresponding thyristor switches. The operating speed of the AC induction motor is monitored and the bypass contactors are closed in response to the AC induction motor operating at a predetermined operating speed. If the operating speed is less than the predetermined operating speed for the AC induction motor, the new alpha firing angle is provided as the initial alpha firing angle. Thereafter, a new alpha firing angle is calculated according to the expression:

$$\alpha_i = \alpha_{i-1} + k^*(I - I_{lim})$$

wherein $\alpha_i$ is the new alpha firing angle; $\alpha_{i-1}$ is the initial alpha firing angle; k is a proportional gain; I is an integral of the motor current over a conduction time interval; and $I_{lim}$ is a user selected pre-set current limit. The absolute value of the expression $k^*(I-I_{lim})$ is compared to an alpha limit prior to calculating the new alpha firing angle. The expression $k^*(I-I_{lim})$ is replaced with the alpha limit in the expression to calculate the new alpha firing angle if the absolute value of the expression $k^*(I-I_{lim})$ is greater than the alpha limit.

In accordance with a still further aspect of the present invention, a method is provided for controlling the voltage and current supplied to an AC motor. The AC motor is interconnected to an AC input source via a thyristor switch. The method includes the steps of initially firing the thyristor switch at a predetermined alpha firing angle after an initial occurrence of zero supply voltage at a motor terminal of the AC motor. The predetermined alpha firing angle is provided as an initial alpha firing angle. A new alpha firing angle, dependant upon the initial alpha firing angle, is calculated and the thyristor switch is fired at the new alpha firing angle after zero supply voltage at a motor terminal of the AC motor. Thereafter, the new alpha firing angle is provided as the initial alpha firing angle.

It is contemplated to provide a bypass contactor in parallel to the thyristor switch. The operating speed of the AC motor is monitored and the bypass switch is closed in response to the AC motor operating at a predetermined operating speed. If the operating speed is less than the predetermined operating speed for the AC motor, a new alpha firing angle is calculated. The new alpha firing angle is according to the expression:

$$\alpha_i = \alpha_{i-1} + k^*(I - I_{lim})$$

wherein $\alpha_i$ is the new alpha firing angle; $\alpha_{i-1}$ is the initial alpha firing angle; k is a proportional gain; I is an integral of the motor current over a conduction time interval; and $I_{lim}$ is a user selected pre-set current limit. The absolute value of the expression $k^*(I-I_{lim})$ is compared to an alpha limit prior to calculating the new gamma alpha firing angle. The expression $k^*(I-I_{lim})$ is replaced with the alpha limit in the expression to calculate the new alpha firing angle if the absolute value of the expression $k^*(I-I_{lim})$ is greater than the alpha limit.

In accordance with a still further aspect of the present invention, a method is provided for controlling a three-phase, AC induction motor. Each phase of the AC induction motor is interconnected to an AC source by a thyristor switch and a bypass contactor connected in parallel in order to provide voltage and current to the AC induction motor. The method includes the steps of sequentially firing pairs of thyristor switches at a predetermined initial alpha firing angle after initial occurences of zero supply voltage at corresponding motor terminals of the AC induction motor. A new alpha firing angle is calculated which is dependant upon the difference between an integral of motor current over a conduction time interval and a user selected pre-set current limit. Pairs of thyristor switches are fired at the new alpha firing angle after subsequent occurrences of zero supply voltage at corresponding motor terminals of the AC induction motor. The operating speed of the AC induction motor is monitored and if the operating speed is less than a predetermined operating speed, the new alpha firing angle is provided as the initial alpha firing angle, and a new alpha firing angle is calculated. The new alpha firing angle is according to the expression:

$$\alpha_i = \alpha_{i-1} + k^*(I - I_{lim})$$

wherein $\alpha_i$ is the new alpha firing angle; $\alpha_{i-1}$ is the initial alpha firing angle; k is a proportional gain; I is the integral of the motor current over a conduction time interval; and $I_{lim}$ is the user selected pre-set current limit. The absolute value of the expression $k^*(I-I_{lim})$ is compared to an alpha limit prior to calculating the new alpha firing angle. The expression $k^*(I-I_{lim})$ is replaced with the alpha limit in the expression to calculate the new alpha firing angle if the absolute value of the expression $k^*(I-I_{lim})$ is greater than the alpha limit. It is contemplated to close the bypass contactors in response to the AC motor operating at the predetermined operating speed.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 3 is a flow chart of computer executable instructions for executing a first embodiment of the method of the present invention;

FIG. 4 is a flow chart of computer executable instructions for executing a second embodiment of the method of the present invention;

FIG. 5 is a flow chart of computer executable instructions for executing a third embodiment of the method of the present invention;

FIGS. 7a and 76b are graphical representations of the voltage across and the current through a pair of anti-parallel thyristor switches in FIG. 6 as a function of time;

DETAILED DESCRIPTION OF THE DRAWINGS

Figure 1:
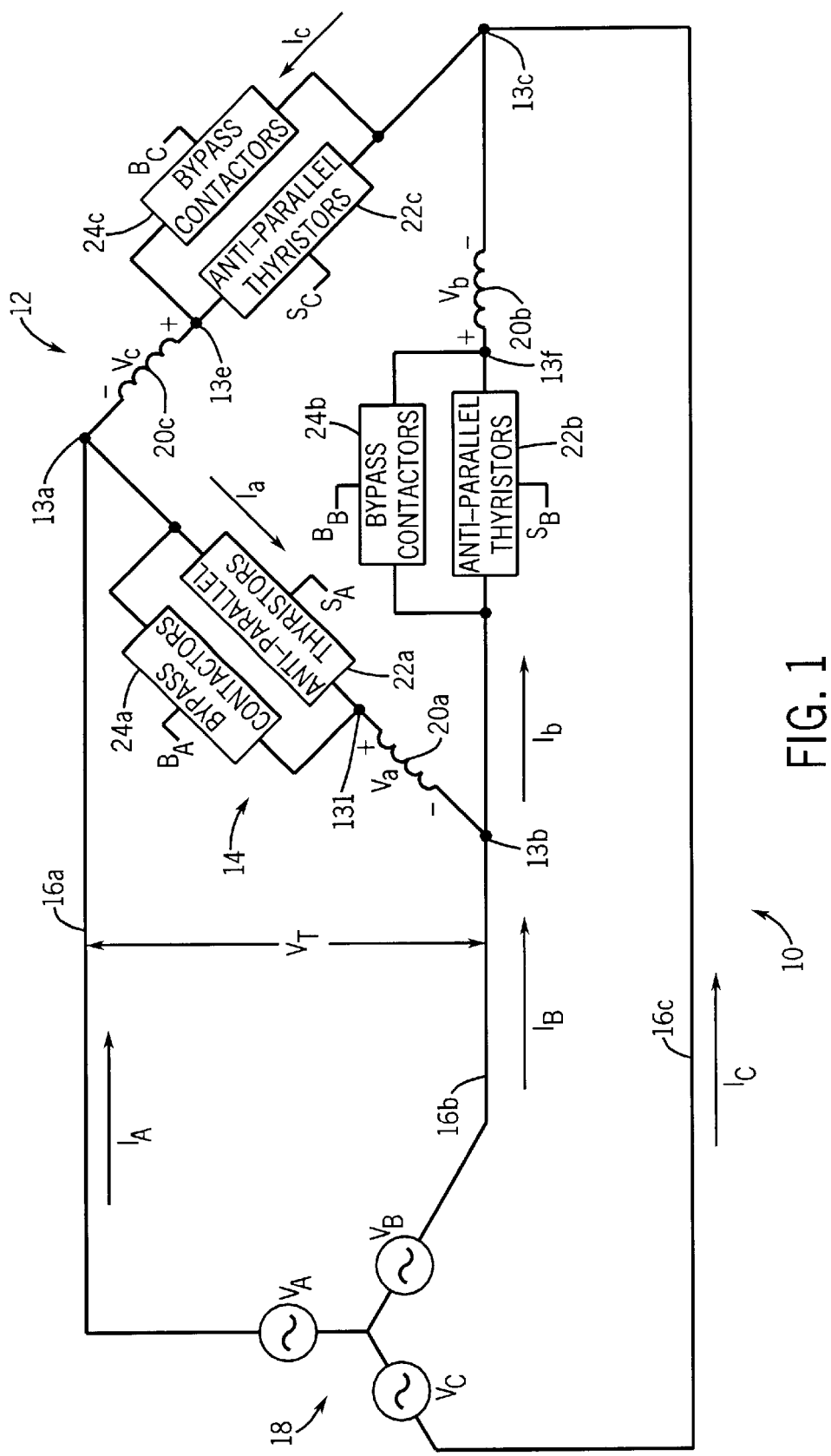
FIG. 1 is a schematic view of a motor system for executing a method in accordance with the present invention.

Referring to FIG. 1, a motor system for executing a method in accordance with the present invention is generally designated by the reference number 10. Motor control system 10 includes an AC induction motor 12 having terminals 13a–f. Terminals 13a, 13b and 13c of AC induction motor 12 are coupled to a three phase AC source 18 by supply lines 16a, 16b and 16c. As is conventional, AC source 18 provides line voltages $V_A$, $V_B$ and $V_C$ and line currents $I_A$, $I_B$ and $I_C$ through corresponding supply lines 16a, 16b and 16c to AC induction motor 12.

In the preferred embodiment, AC induction motor 12 is a delta motor and soft starter 14 is applied in series with windings 20a, 20b and 20c of AC induction motor 12. Soft starter 14 includes anti-parallel silicon controlled rectifiers (SCRs) or thyristor switches 22a, 22b, and 22c which are connected in series with corresponding windings 20a, 20b and 20c of AC induction motor 12. Each thyristor switch 22a, 22b and 22c consists of a pair of inversely connected SCRs used to control the phase voltages $V_a$, $V_b$ and $V_c$ across and phase currents $I_a$, $I_b$ and $I_c$ through windings 20a, 20b and 20c of AC induction motor 12. Bypass contactors 24a, 24b and 24c are connected in parallel to corresponding thyristor switches 22a, 22b and 22c, respectively, for reasons hereinafter described.

Figure 2A:
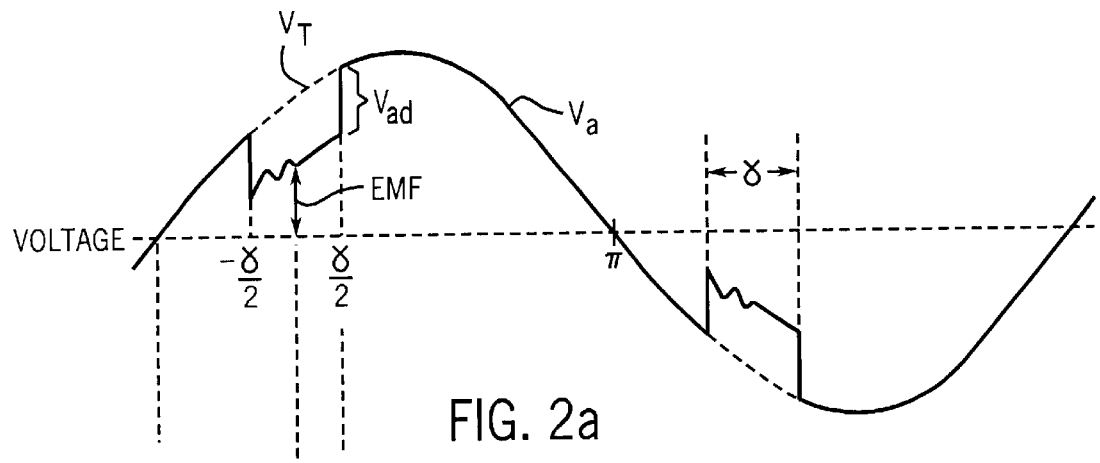
FIGS. 2a and 2b are graphical representations of the voltage across and the current through a pair of anti-parallel thyristor switches in FIG. 1 as a function of time.
Figure 2B:
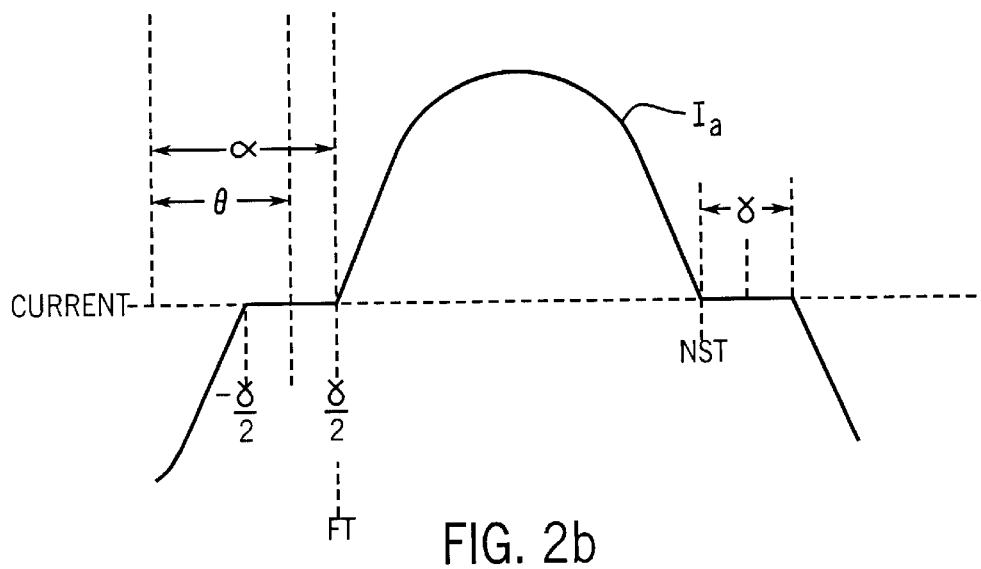

The phase voltages $V_a$, $V_b$ and $V_c$ across and phase currents $I_a$, $I_b$ and $I_c$ through windings 20a, 20b and 20c of AC induction motor 12 are identical but for being 120° out of phase with each other. Further, phase currents $I_a$, $I_b$ and $I_c$ lag the phase voltages $V_a$, $V_b$ and $V_c$ by an angle θ corresponding to the power factor of AC induction motor 12. By way of example, referring to FIGS. 2a and 2b, phase voltage $V_a$ across winding 20a is compared to the phase current $I_a$ and terminal voltage $V_T$ which is the difference in potential between terminals 13d and 13b of AC induction motor 12. As is known, the waveform of terminal voltage $V_T$ is sinusoidal. The phase voltage $V_a$ is generally identical to the terminal voltage $V_T$ except during a small, non-conducting time or notch having a duration γ which is introduced into each half cycle of terminal voltage $V_T$. Notch γ is introduced into terminal voltage $V_T$ each time phase current $I_a$ falls to zero. Phase current $I_a$ remains at zero until the end of notch γ at which time phase current $I_a$ continues a pulsating waveform.

The phase current $I_a$ is controlled by the duration of notch γ. During notch γ, thyristor switch 22a which interconnects motor terminal 13a and winding 20a operates as an open circuit so that instead of observing sinusoidal terminal voltage $V_T$ between motor terminals 13d and 13b, an internal motor generated back EMF voltage may be seen. The back EMF voltage is generally equal to the terminal voltage $V_T$ minus the voltage drop $V_{ad}$ across thyristor switch 22a.

In accordance with the present invention, four alternate approaches for starting and bringing the AC induction motor to its full operating speed are provided. Referring to FIG. 3, in the first approach generally designated by the reference numeral 28, thyristor switches 22a, 22b and 22c are fired (turned on) after a user selected alpha firing angle α after the initial zero voltage crosses of corresponding terminal voltages $V_T$. In the preferred embodiment, the user selected alpha firing angle α is generally equally to 135°, block 30. However, other values for the user selected alpha firing angle α are contemplated as being within the scope of the present invention.

Thereafter, the alpha firing angle a is reduced by a predetermined amount and thyristor switches 22a, 22b and 22c are fired again at the reduced alpha firing angle α after the next zero voltage crosses of corresponding terminal voltages $V_T$. In the preferred embodiment, the reduced or new alpha firing angle is calculated according to the expression:

$$\alpha_i = -16 * t + 135$$

wherein $\alpha_i$ is the new alpha firing angle; "–16" and "135" are constants which may be varied according to the application; and t is the elapsed time from the initial firing of thyristor switches 22a, 22b and 22c, block 32. The process is repeated for a predetermined period of time, e.g. 2.5 seconds, block 34.

Upon completion of the predetermined period of time, the alpha firing angle α is maintained at a selected alpha firing angle α, block 36, and thyristor switches 22a, 22b and 22c are subsequently fired at such alpha firing angle α after each zero voltage crosses of corresponding terminal voltages $V_T$ for a second predetermined time period, e.g. 8 seconds, block 38. Upon completion of the second predetermined time period, the control methodology is changed from alpha control to gamma control, block 40.

In gamma control, the phase currents $I_a$, $I_b$ and $I_c$ of AC induction motor 12 are maintained by maintaining the half cycle time of thyristor switches 22a, 22b and 22c such that the duration of notch γ is maintained until AC induction motor 12 is at full operating speed, block 42. In the preferred embodiment, the duration of notch γ is maintained at 10°, block 40, but other angles are contemplated as being within the scope of the present invention. Full operating speed of AC induction motor 12 may be determined in any conventional manner. For example, by maintaining the phase currents $I_a$, $I_b$ and $I_c$ of AC induction motor 12 at a predetermined level over a predetermined period of time, the angle θ, FIGS. 2a and 2b, of the power factor of AC induction motor 12 is reduced and the back EMF voltages approach the terminal voltages $V_T$. Once the back EMF voltages exceed a predetermined value, AC induction motor 12 is at full operating speed and corresponding bypass contactors 24a, 24b and 24c are sequentially closed, block 44, such that windings 20a, 20b and 20c are connected directly between corresponding pairs of motor terminals 13a, 13b and 13c.

Referring to FIG. 4, in the second approach generally designated by the reference numeral 46, thyristor switches 22a, 22b and 22c are fired after a user selected alpha firing angle α, i.e. 135°, block 48, after the initial zero voltage crosses of corresponding terminal voltages $V_T$. Thereafter, the alpha firing angle α is reduced and thyristor switches 22a, 22b and 22c are fired again at the reduced alpha firing angle α after the next zero voltage crosses of corresponding terminal voltages $V_T$. As heretofore described, in the preferred embodiment, the reduced or new alpha firing angle is calculated according to the expression:

$$\alpha_i = -16 * t + 135$$

wherein $\alpha_i$ is the new alpha firing angle; "–16" and "135" are constants which may be varied according to the application; and t is the elapsed time from the initial firing of thyristor switches 22a, 22b and 22c, block 50. The process is repeated for a predetermined period of time, e.g. 2.5 seconds, block 52.

Upon completion of the predetermined period of time, the alpha firing angle α is maintained, block 54, at a selected alpha firing angle α, e.g. 95°, and thyristor switches 22a, 22b and 22c are subsequently fired at such alpha firing angle α after each zero voltage crosses of corresponding terminal voltages $V_T$.

As thyristor switches 22a, 22b and 22c are subsequently fired at alpha firing angle α, the current limit $I_{lim}$ of AC induction motor 12 is determined. In the preferred embodiment, current limit is calculated according to the expression:

$$I_{lim} = \int_{FT}^{NST} |i(t)| dt$$

wherein $I_{lim}$ is the current limit, FT is the initial firing time of the thyristor switches; NST is the next stopping time of the thyristor switches; i(t) is the instantaneous phase current; and, in the preferred embodiment, 2.5 seconds <t<3.5 seconds, block 54.

Thereafter, the phase currents $I_a$, $I_b$ and $I_c$ of AC induction motor 12 are determined according to the expression:

$$I = \int_{FT}^{NST} |i(t)| dt$$

wherein I is the integral of the motor current over the previous conduction interval; FT is the initial firing time of the thyristor switches; NST is the next stopping time of the thyristor switches; and i(t) is the instanteous phase current, block 56.

As long as the instantaneous phase currents $I_a$, $I_b$ and $I_c$ of AC induction motor 12 are greater than a predetermined percentage of the current limit $I^{lim}$ of AC induction motor 12, e.g. $0.8*I^{lim}$, the process is repeated and thyristor switches 22a, 22b and 22c are fired again at the selected alpha firing angle α, block 58. If the phase currents $I_a$, $I_b$ and $I_c$ of AC induction motor 12 drop below the predetermined percentage of the current limit $I^{lim}$, the control methodology is changed from alpha control to gamma control, block 60.

As heretofore described with respect to the first approach, in gamma control, the phase currents $I_a$, $I_b$ and $I_c$ of AC induction motor 12 are maintained by maintaining the half cycle time of thyristor switches 22a, 22b and 22c such that the duration of notch γ is maintained until AC induction motor 12 is at full operating speed, block 62. In the preferred embodiment, the duration of notch γ is maintained at 10°, block 60, but other angles are contemplated as being within the scope of the present invention. Upon a determination that the AC induction motor 12 is at full operating speed, bypass contactors 24a, 24b and 24c are sequentially closed, block 64, such that windings 20a, 20b and 20c are connected directly between corresponding pairs of motor terminals 13a, 13b and 13c.

Referring to FIG. 5, in the third approach generally designated by the reference numeral 66, thyristor switches 22a, 22b and 22c are initially fired at a user selected alpha firing angle α, i.e. 135°, block 68, after the initial zero voltage crosses of corresponding terminal voltages $V_T$. Thereafter, a new alpha firing angle α is calculated based upon the error between the integration of the phase currents $I_a$, $I_b$ and $I_c$ of AC induction motor 12 and the current limit $I^{lim}$ of AC induction motor 12, block 70. In the preferred embodiment, current limit $I^{lim}$ is a known constant, block 68, and the phase currents $I_a$, $I_b$ and $I_c$ of AC induction motor 12 are determined according to the expression:

$$I = \int_{FT}^{NST} |i(t)| dt$$

wherein I is the integral of the motor current over the previous conduction interval; FT is the initial firing time of the thyristor switches; NST is the next stopping time of the thyristor switches; and i(t) is the instanteous phase current, block 70.

The new alpha firing angle is reduced according to the expression:

$$\alpha_i = \alpha_{i-1} + k*(I - I_{lim})$$

wherein $\alpha_i$ is the new alpha firing angle; $\alpha_{i-1}$ is the prior alpha firing angle; k is a proportional gain; I is the integral of the motor current over the various conduction interval; and $I_{lim}$ is a user selected pre-set current limit, block 72. To maintain the stability of AC induction motor 12, it is contemplated that the maximum absolute value of the expression $k*(I-I_{lim})$ be limited to 0.25°, block 72. Thyristor switches 22a, 22b and 22c are fired again at the new alpha firing angle a, after the next zero voltage crosses of corresponding terminal voltages $V_T$ and the process is repeated until the phase currents $I_a$, $I_b$ and $I_c$ of AC induction motor 12 drop below a predetermined percentage of the current limit $I^{lim}$, e.g. $0.8*I^{lim}$, indicating that the AC induction motor 12 is approaching full operating speed, block 74. Once the phase currents $I_a$, $I_b$ and $I_c$ of AC induction motor 12 drop below the predetermined percentage of the current limit $I_{lim}$, the control methodology is changed from alpha control to gamma control, block 76.

In gamma control, gamma is initialized, block 77, according to the expression:

$$\gamma_{i-1} = 2*\alpha_i - 180°$$

wherein $\gamma_{i-1}$, is the initial gamma firing angle and $\alpha_i$ is the new alpha firing angle as heretofore described; and the phase currents $I_a$, $I_b$ and $I_c$ are gradually increased over a period of time. In order to increase the phase currents $I_a$, $I_b$ and $I_c$ applied to AC induction motor 12, the half cycle time of thyristor switches 22a, 22b and 22c must be increased. In order to gradually increase the half cycle time of the thyristor switches 22a, 22b and 22c, the duration of notch γ in the voltage waveforms $V_T$ is reduced with each subsequent firing thyristor switches 22a, 22b and 22c according to expression:

$$\gamma_i = \gamma_{i-1} + k*(I - I^{lim})$$

wherein $\gamma_i$ is the new gamma firing angle; $\gamma_{i-1}$ is the initial gamma firing angle; k is a proportional gain; I is the integral of the motor current over the previous conduction interval; and $I^{lim}i$, is a user selected pre-set current limit, block 78. To maintain the stability of AC induction motor 12, it is contemplated that the maximum absolute value of the expression $k*(I-I_{lim})$ be limited to 0.25°, block 78. Thyristor switches 22a, 22b and 22c are fired again at the new gamma firing angle γ, after the next zero current crosses of corresponding phase currents $I_a$, $I_b$ and $I_c$ and the process is repeated until the AC induction motor 12 is at full operating speed, block 80. Once the AC induction motor 12 is at full operating speed, bypass contactors 24a, 24b and 24c are sequentially closed, block 82, such that windings 20a, 20b and 20c are connected directly between corresponding pairs of motor terminals 13a, 13b and 13c.

In order for soft starter 14 to function as heretofore described, it is contemplated that a microprocessor (not pictured) carry out a number of predetermined functions which are incorporated into computer executable instructions, FIGS. 3–5. It should be understood that while these functions are described as being implemented in software, it is contemplated that the functions could be implemented in discreet solid state hardware, as well as, the combination of solid state hardware and software.

It is contemplated that in order to effectuate the methods of the present invention, the microprocessor will include a plurality of inputs corresponding to selected parameters heretofore described. For example, such inputs include line voltages $V_A$, $V_B$ and $V_C$; line currents $I_A$, $I_B$ and $I_C$; phase voltages $V_a$, $V_b$ and $V_c$; and phase currents $I_a$, $I_b$ and $I_c$. Further, it is contemplated that the microprocessor generate a plurality of output signals which correspond to selected instructions heretofore described. For example, referring back to FIG. 1, microprocessor generates firing signals $S_A$, $S_B$ and $S_C$ to fire corresponding thyristor switches 22a, 22b, and 22c, respectively, at appropriate times, as heretofore described. Similarly, microprocessor generates firing signals $B_A$, $B_B$ and $B_C$ to close corresponding bypass contactors 24a, 24b, and 24c, respectively, at appropriate times, as heretofore described.

Figure 6:
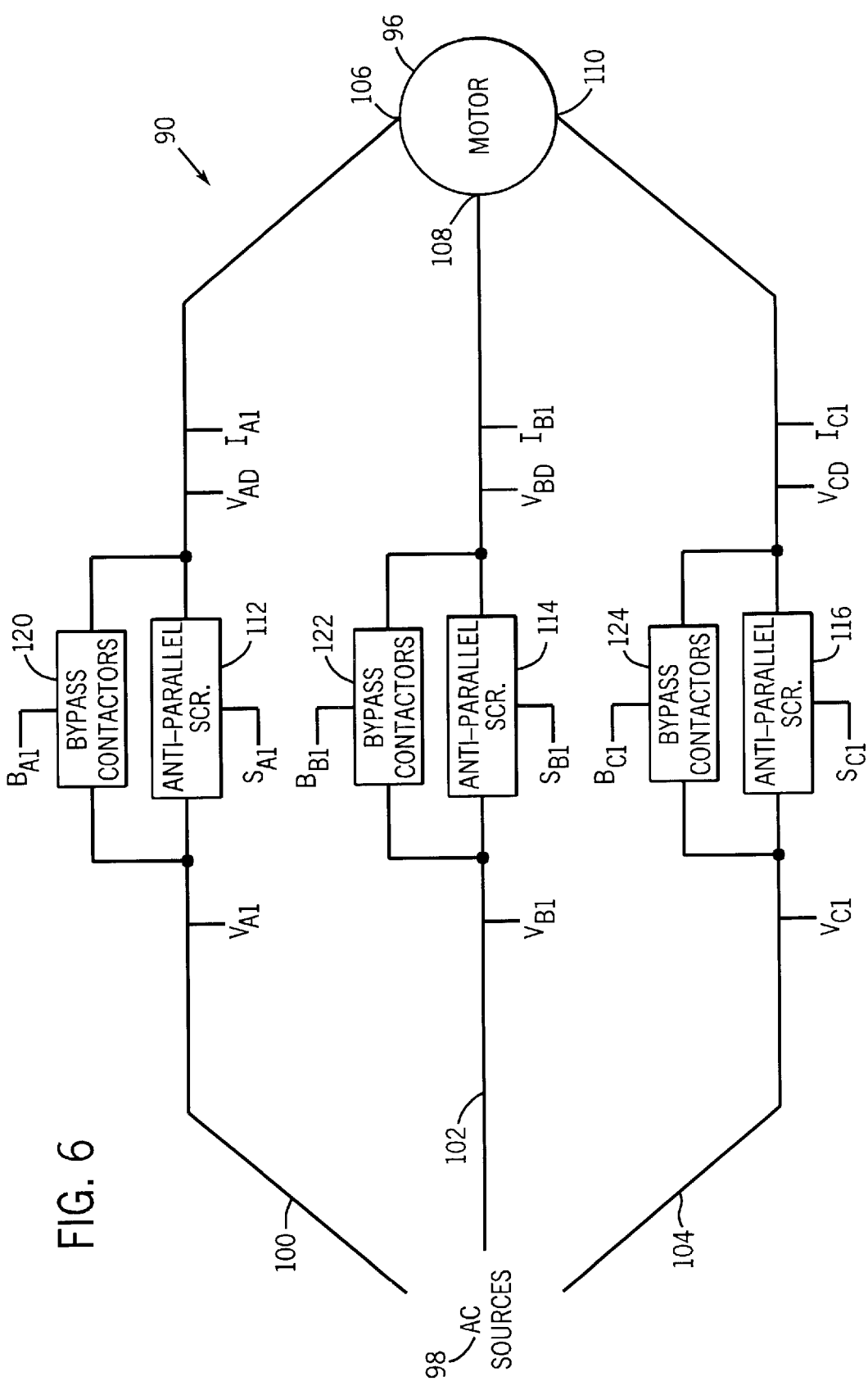
FIG. 6 is a schematic view of a motor system for executing an alternate method in correspondence with the present invention.

Referring to FIG. 6, an alternate motor control system in accordance with the present invention is generally designated by the reference number 90. Motor control system 90 includes an AC induction motor 96 coupled to an AC source 98, as hereinafter described.

As is conventional, AC induction motor 96 has three windings. Each winding of AC induction motor 96 is operatively connected to a corresponding supply line 100, 102 and 104 from AC source 98 at motor terminals 106, 108 and 110, respectively. Anti-parallel silicon controlled rectifiers (SCRs) or thyristor switches 112, 114, and 116 are also provided. Each thyristor switch 112, 114 and 116 consists of a pair of inversely connected SCRs used to control the voltage on, and the current through, an associated supply line 100, 102 and 104, respectively, which, in turn, alters the current supplied to and the voltage at motor terminals 106, 108, and 110, respectively, of AC induction motor 96.

Figure 7A:
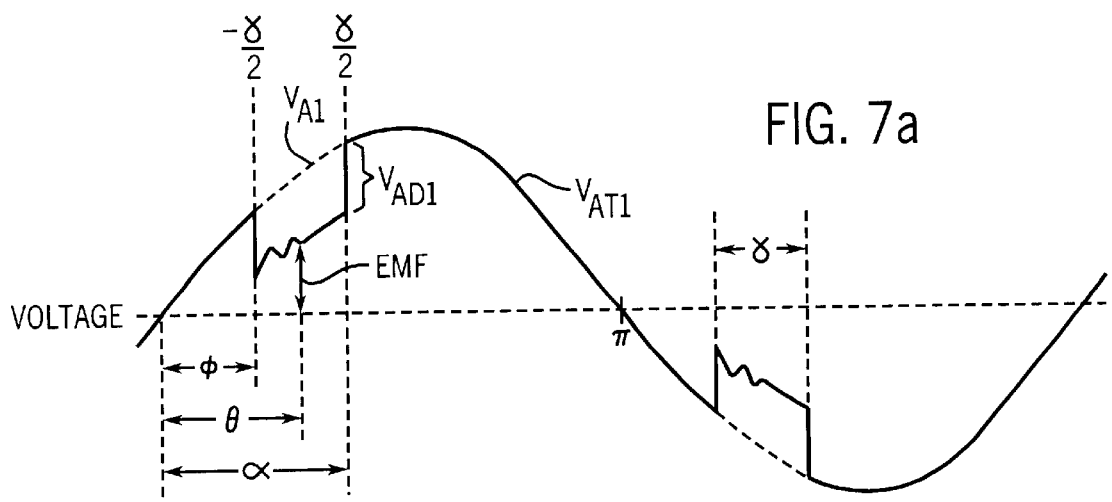
Figure 7B:
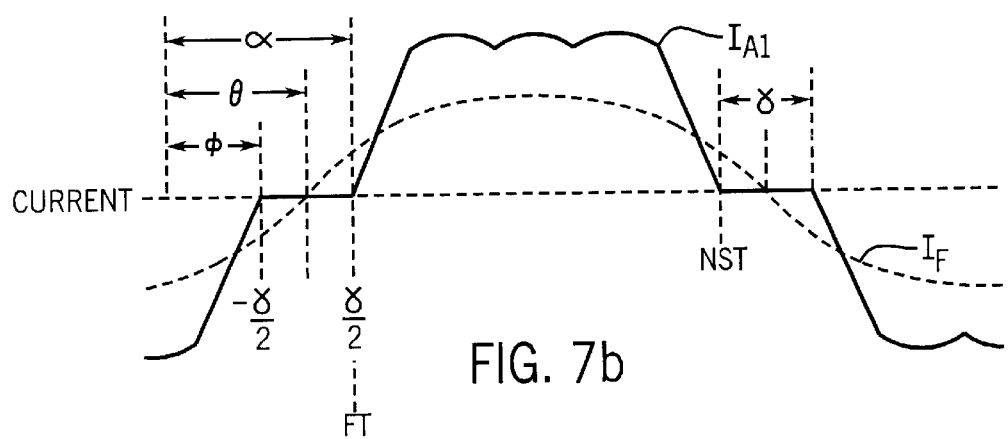

The terminal voltages $V_{T1}$ at motor terminals 106, 108 and 110 of AC induction motor 96, the supply voltages $V_{A1}$, $V_{B1}$, and $V_{C1}$, and the line currents $I_{A1}$, $I_{B1}$ and $I_{C1}$ are identical but for being 120° out of phase with each other. By way of example, referring to FIGS. 6 and 7a–7b, terminal voltage $V_{AT1}$ at motor terminal 106 is compared to the line current $I_{A1}$ and the supply voltage $V_{A1}$ from AC source 98. As is known, the waveform of supply voltage $V_{A1}$ is sinusoidal. When controlled by phase control, the terminal voltage $V_{A1}$ is generally identical to the supply voltage $V_{A1}$ except during a small non-conducting time or notch having a duration γ which is introduced into each half cycle of supply voltage $V_{A1}$. Notch γ is introduced into the supply voltage $V_{A1}$ each time line current $I_{A1}$ falls to zero. Line current $I_{A1}$ remains at zero until the end of notch γ at which time line current $I_{A1}$ continues a pulsating waveform.

The supply line current $I_{A1}$ is controlled by the duration of notch γ. During notch γ, thyristor switch 112 which interconnects motor terminal 106 to AC source 98 operates as an open circuit so that instead of observing sinusoidal supply voltage $V_{A1}$ at motor terminal 106, an internal motor generated back EMF voltage may be seen. The back EMF voltage is generally equal to the source voltage $V_{A1}$ minus the voltage drop $V_{AD1}$ across thyristor switch 112.

There are various approaches to bring AC induction motor 96 to its operating speed. In the first approach, line currents $I_{A1}$, $I_{B1}$ and $I_{C1}$ are gradually increased over a period of time. In order to increase the line currents $I_{A1}$, $I_{B1}$ and $I_C$ applied to AC induction motor 96, the conduction period of thyristor switches 112, 114 and 116 is increased. As the conduction period of the thyristor switches 112, 114 and 116 is gradually increased during each half cycle, the duration of notch γ in the voltage waveforms at motor terminals 106, 108 and 110 is reduced. In addition, as the conduction period of thyristor switches 112, 114 and 116 is gradually increased and the AC induction motor 96 approaches operating speed, the back EMF voltages at motor terminals 106, 108, and 110 increase. It is contemplated that once the back EMF voltages at motor terminals 106, 108 and 110 exceed a predetermined value, the AC induction motor 96 is considered operating at its full operating speed. If the motor current has fallen to the FLA for the AC induction motor 96, bypass contactors 120, 122, and 124, which are connected in parallel to corresponding thyristor switches 112, 114, and 116, respectively, are sequentially closed. With bypass contactors 120, 122 and 124 closed, motor terminal 106 of AC induction motor 96 is connected directly to AC source 98 through supply line 100, motor terminal 108 of AC induction motor 96 is connected directly AC source 98 through supply line 102, and motor terminal 110 of AC induction motor 96 is connected directly to AC source 98 through supply line 104.

Alternatively, AC induction motor 96 may be brought to operating speed by providing constant current thereto. As is known, line current $I_{A1}$, $I_{B1}$ and $I_{C1}$ lags the supply voltage $V_{A1}$, $V_{B1}$ and $V_{C1}$ by an angle θ corresponding to the power factor of AC induction motor 96. The line currents $I_{A1}$, $I_{B1}$ and $I_{C1}$ to AC induction motor 16 are maintained by maintaining the conduction period of thyristor switches 112, 114 and 116 such that the duration of notch γ is maintained. By maintaining the line currents $I_{A1}$, $I_{B1}$ and $I_{C1}$ to AC induction motor 96 at a predetermined level over a predetermined period of time, the angle θ of the power factor of AC induction motor 16 reduces as AC induction motor 96 accelerates and the back EMF voltages at motor terminals 106, 108 and 110 approaches corresponding source voltages $V_{A1}$, $V_{B1}$ and $V_{C1}$, respectively. It is contemplated that once the back EMF voltages at motor terminals 106, 108 and 110 exceed a predetermined value, corresponding bypass contactors 120, 122 and 124, respectively, are sequentially closed such that motor terminal 106 of AC induction AC induction motor 96 is connected directly to AC source 98 through supply line 100, motor terminal 108 of motor 96 is connected directly to AC source 98 through supply line 102, and motor terminal 110 of AC induction motor 96 is connected directly to AC source 98 through supply line 104.

Figure 8:
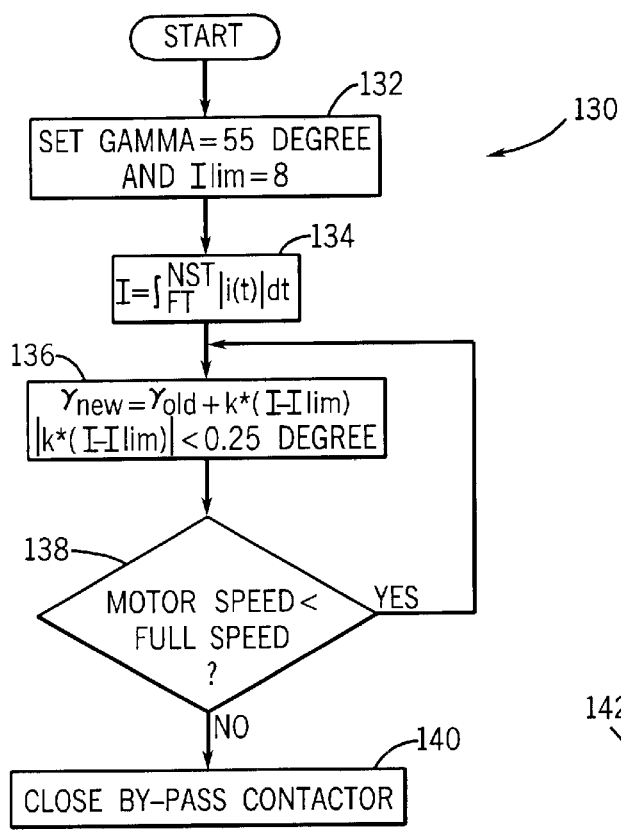
FIG. 8 is a flow chart of computer executable instructions for executing a fourth embodiment of the method of the present invention.

Referring to FIG. 8, in accordance with the present invention, in order to provide increased stability during acceleration of AC induction motor 96, an alternate approach generally designated by the reference numeral 130 is provided. Thyristor switches 112, 114 and 116 are initially fired at a user selected initial gamma firing angle gamma, i.e. 55°, block 132, after each zero supply current therethrough. A preset current limit $I_{lim}$, block 132, is selected by the user. As pairs of thyristor switches 112, 114 and 116 are sequentially fired at the initial gamma firing angle, γ, the phase currents $I_{a1}$, $I_{b1}$ and $I_{c1}$ of AC induction motor 96 are determined according to the expression:

$$I = \int_{FT}^{NST} |i(t)| dt$$

wherein I is the integral of the motor current over the previous conduction interval; FT is the initial firing time of the thyristor switches; NST is the next stopping time of the thyristor switches; and i(t) is the instantaneous phase current, block 134.

In order to gradually vary the half cycle time of the thyristor switches 112, 114 and 116, the duration of notch γ in the voltage waveforms $V_T$ is varied with each subsequent firing of thyristor switches 112, 114 and 116 according to expression:

$$\gamma_i = \gamma_{i-1} + k^*(I - I_{lim})$$

wherein $\gamma_i$ is the new gamma firing angle; $\gamma_{i-1}$ is the initial gamma firing angle; k is a proportional gain; I is the integral of the motor current over the previous conduction interval; and $I_{lim}$ is a user selected pre-set current limit, block 136.

To maintain the stability of AC induction motor 96, it is contemplated that the maximum absolute value of the expression $k*(I-I^{lim})$ be limited to 0.25°, block 136. Pairs of thyristor switches, 11 2, 114 and 116 are fired again at the new gamma firing angle $\gamma_i$ after the next zero current crossing of corresponding phase currents $I_{a1}$, $I_{b1}$, $I_{c1}$ and the process is repeated until the AC induction motor 96 is at full operating speed, block 138. Once the AC induction motor 96 is at full speed, bypass contactors 120, 122 and 124 are sequentially closed, block 140, such that motor terminals 106, 108 and 110 are connected directly to AC source 98.

Figure 9:
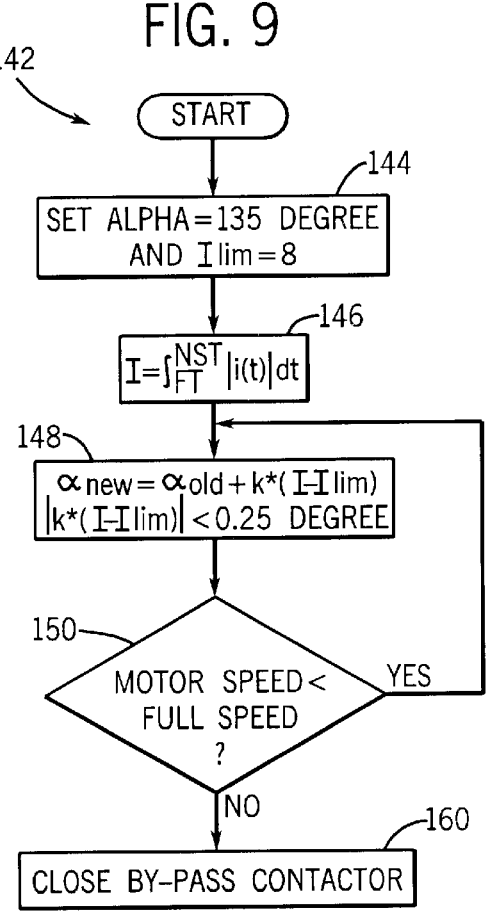
FIG. 9 is a flow chart of computer executable instructions for executing a fifth embodiment of the method of the present invention.

Referring to FIG. 9, a still further approach for providing increased stability during acceleration of AC induction motor 96 is generally designated by the reference numeral 142. Thyristor switches 112, 114 and 116 are initially fired at user selected initial alpha firing angle $\alpha$, i.e. 135°, block 144, after the initial zero voltage crosses of corresponding terminal voltages $V_{T1}$. A preset current limit $I^{lim}$, block 144, is selected by the user. As pairs of thyristor switches 112, 114 and 116 are sequentially fired at the initial alpha firing angle, $\alpha$, the phase currents $I_{a1}$, $I_{b1}$, and $I_{c1}$ of AC induction motor 96 are determined according to the expression:

$$I=\int_{FT}^{NST}|i(t)|dt$$

wherein I is the integral of the motor current over the previous conduction interval; FT is the initial firing time of the thyristor switches; NST is the next stopping time of the thyristor switches; and i(t) is the instantaneous phase current, block 146.

In order to gradually accelerate an AC induction motor 96, the alpha firing angle, $\alpha$, is varied with each subsequent firing of thyristor switches 112, 114 and 116 according to expression:

$$\alpha_i=\alpha_{i-1}+k*(I-I^{lim})$$

wherein $\alpha_i$ is the new alpha firing angle; $\alpha_{i-1}$ is the initial alpha firing angle; k is a proportional gain; I is the integral of the motor current over the previous conduction interval; and $I^{lim}$ is a user selected pre-set current limit, block 148.

To maintain the stability of AC induction motor 96, it is contemplated that the maximum absolute value of the expression $k*(I-I_{lim})$ be limited to 0.25°, block 148. Pairs of thyristor switches 112, 114 and 116 are fired again at the new alpha firing angle $\alpha_i$ after the next zero voltage crosses of corresponding terminal voltages $V_{T1}$ and the process is repeated until the AC induction motor 96 is at full operating speed, block 150. Once the AC induction motor 96 is at full speed, bypass contactors 120, 122 and 124 are sequentially closed, block 160, such that motor terminals 106, 108 and 110 are connected directly to AC source 98.

It is contemplated that a microprocessor (not pictured) carry out a number of predetermined functions which are incorporated into computer executable instructions, FIGS. 8–9. It should be understood that while these functions are described as being implemented in software, it is contemplated that the functions could be implemented in discreet solid state hardware, as well as, the combination of solid state hardware and software.

It is contemplated that in order to effectuate the methods of the present invention; the microprocessor will include a plurality of inputs corresponding to selected parameters heretofore described. For example, such inputs include line voltages $V_{A1}$, $V_{B1}$ and $V_{C1}$ line currents $I_{A1}$, $I_{B1}$ and $I_{C1}$ phase voltages $V_{a1}$, $V_{b1}$, and $V_{c1}$ and phase currents $I_{a1}$, $I_{b1}$, $I_{c1}$. Further, it is contemplated that the microprocessor generate a plurality of output signals which correspond to selected instructions heretofore described. For example, referring back to FIG. 6, microprocessor generates firing signals $S_{A1}$, $S_{B1}$ and $S_{C1}$ to fire corresponding thyristor switches 112, 114, and 116, respectively, at appropriate times, as heretofore described. Similarly, microprocessor generates firing signals $B_{A1}$, $B_{B1}$ and $B_{C1}$ to close corresponding bypass contactors 120, 122 and 124, respectively, at appropriate times, as heretofore described.

Various modes of carrying out the invention are contemplated as being within the scope of the following claims particularly pointing out and distinctly claiming the subject matter which is regarded as the invention.

We claim:

1. A method for controlling a three phase, AC induction motor, each phase of the AC induction motor interconnected to an AC input source by a thyristor switch for providing voltage and current to the AC induction motor, the method comprising the steps of:

sequentially firing pairs of thyristor switches at an initial alpha firing angle after initial occurrences of zero supply voltage at corresponding motor terminals of the AC induction motor;

calculating a new alpha firing angle dependent upon the initial alpha firing angle, the new alpha firing angle calculated according to the expression:

$$\alpha_i=\alpha_{i-1}+k*(I-I_{lim})$$

wherein $\alpha_i$ is the new alpha firing angle; $\alpha_{i-1}$ is the initial alpha firing angle; k is a proportional gain; I is an integral of the motor current limit over a conduction time interval; and $I_{lim}$ is a user selected pre-set current limit; and sequentially firing pairs of thyristor switches at the new alpha firing angle after subsequent occurrences of zero supply voltage at corresponding motor terminals of the AC induction motor.

2. The method of claim 1 comprising the additional steps of:

providing bypass contactors in parallel across corresponding thyristor switches;

monitoring the operating speed of the AC induction motor; and closing the bypass contactors in response to the AC induction motor operating at a predetermined operating speed.

3. The method of claim 1 wherein after the step of sequentially firing pairs of thyristor switches at the new alpha firing angle, executing the additional steps of:

monitoring the operating speed of the AC induction motor and if the operating speed is less than a predetermined operating speed of the AC induction motor, executing the additional steps of:

providing the new alpha firing angle as the initial alpha firing angle; and returning to the step of calculating the new alpha firing angle.

4. The method of claim 1 comprising the additional steps of comparing the absolute value of the expression $k*(I-I_{lim})$ to an alpha limit prior to calculating the new alpha firing angle and replacing the expression $k*(I-I_{lim})$ with the alpha limit in the expression to calculate the new alpha firing angle if the absolute value of the expression $k*(I-I_{lim})$ is greater than the alpha limit.

5. A method for controlling the voltage and current supplied to an AC motor, the AC motor interconnected to an AC input source by a thyristor switch, the method comprising the steps of:
- initially firing the thyristor switch at a predetermined alpha firing angle after an initial occurrence of zero supply voltage at a motor terminal of the AC motor and providing the predetermined alpha firing angle as an initial alpha firing angle;
- calculating a new alpha firing angle which is dependent upon the initial alpha firing angle, the new alpha firing angle calculated according to the expression:

$$\alpha_i = \alpha_{i-1} + k^*(I - I_{lim})$$

wherein $\alpha_i$ is the new alpha firing angle; $\alpha_{i-1}$ is the initial alpha firing angle; k is a proportional gain; I is an integral of the motor current limit over a conduction time interval; and $I_{lim}$ is a user selected pre-set current limit;
- firing the thyristor switch at the new alpha firing angle after a subsequent occurrence of zero supply voltage at a motor terminal of the AC motor; and
- providing the new alpha firing angle as the initial angle firing angle.

6. The method of claim 5 comprising the additional steps of:
- providing a bypass contactor in parallel across the thyristor switch;
- monitoring the operating speed of the AC motor; and
- closing the bypass contactor in response to the AC motor operating at a predetermined operating speed.

7. The method of claim 5 wherein after the step of firing the thyristor switch at the new alpha firing angle, conducting the additional steps of:
- monitoring the operating speed of the AC motor and if the operating speed is less than a predetermined operating speed of the AC motor, executing the additional step of returning to the step of calculating the new alpha firing angle.

8. The method of claim 5 comprising the additional steps of comparing the absolute value of the expression $k^*(I-I_{lim})$ to an alpha limit prior to calculating the new alpha firing angle and replacing the expression $k^*(I-I_{lim})$ with the alpha limit in the expression to calculate the new alpha firing angle if the absolute value of the expression $k^*(I-I_{lim})$ is greater than the alpha limit.

9. A method for controlling a three phase, AC induction motor, each phase of the AC induction motor interconnected to an AC input source by a thyristor switch and a bypass contactor connected in parallel for providing voltage and current to the AC induction motor, the method comprising the steps of:
- sequentially firing pairs of thyristor switches at a predetermined initial alpha firing angle after initial occurrences of zero supply voltage at corresponding motor terminals of the AC induction motor;
- calculating a new alpha firing angle which is dependant upon the difference between the integral of motor current over a conduction time interval and a user selected pre-set current limit.
- sequentially firing pairs of thyristor switches at the new alpha firing angle after subsequent occurrences of zero supply voltage at corresponding motor terminals of the AC induction motor; and
- monitoring the operating speed of the AC induction motor and if the operating speed is less than a predetermined operating speed of the AC induction motor, executing the additional steps of:
  - providing the new alpha firing angle as the initial alpha firing angle; and
  - returning to the step of calculating the new alpha firing angle.

10. The method of claim 9 comprising the additional step of closing the bypass contactors in response to the AC motor operating at the predetermined operating speed.

11. The method of claim 9 wherein the new alpha firing angle is calculated according to the expression:

$$\alpha_i = \alpha_{i-1} + k^*(I - I_{lim})$$

wherein $\alpha_i$ is the new alpha firing angle; $\alpha_{i-1}$ is the initial alpha firing angle; k is a proportional gain; I is the integral of the motor current over a conduction time interval; and $I_{lim}$ is the user selected pre-set current limit.

12. The method of claim 11 comprising the additional steps of comparing the absolute value of the expression $k^*(I-I_{lim})$ to an alpha limit prior to calculating the new alpha firing angle and replacing the expression $k^*(I-I_{lim})$ with the alpha limit in the expression to calculate the new alpha firing angle if the absolute value of the expression $k^*(I-I_{lim})$ is greater than the alpha limit.

* * * * *